United States Patent [19]

Scammell

[11] Patent Number: 4,733,801
[45] Date of Patent: Mar. 29, 1988

[54] METHOD OF AND MEANS FOR MANUFACTURE OF A DISPENSER FOR VISCOUS OR SEMI-VISCOUS MATERIALS

[76] Inventor: John F. Scammell, 7 The Common, Beaumont, S.A. 5066, Australia

[21] Appl. No.: 939,125

[22] PCT Filed: Feb. 13, 1986

[86] PCT No.: PCT/AU86/00036
§ 371 Date: Oct. 20, 1986
§ 102(e) Date: Oct. 20, 1986

[87] PCT Pub. No.: WO86/04856
PCT Pub. Date: Aug. 28, 1986

[30] Foreign Application Priority Data

Feb. 19, 1985 [AU] Australia ................. PG9357

[51] Int. Cl.⁴ .................. B65D 35/08; A23P 1/00
[52] U.S. Cl. .................... 222/107; 222/215;
 222/556; 264/328.7; 425/577; 249/146;
 215/235; 220/337
[58] Field of Search ............ 264/328.7, 328.12;
 249/146, 147; 425/577, DIG. 58, DIG. 809;
 222/107, 206, 212, 215, 517, 541, 545, 556;
 220/334, 337–339; 215/235

[56] References Cited

U.S. PATENT DOCUMENTS

| 2,252,090 | 8/1941 | Morin et al. | |
| 2,822,578 | 2/1958 | Lobell . | |
| 3,537,676 | 11/1970 | Miller | 425/577 X |
| 4,071,532 | 1/1978 | Rose | 264/328.7 |
| 4,243,620 | 1/1981 | Curetti et al. | 425/577 X |
| 4,261,486 | 4/1981 | Bush et al. | 222/517 |
| 4,465,651 | 8/1984 | Godschalk, Jr. et al. | 264/161 |
| 4,470,521 | 9/1984 | Scammell | 222/107 |

FOREIGN PATENT DOCUMENTS 175771 1/1972 Australia .

Primary Examiner—Joseph J. Rolla
Assistant Examiner—Michael S. Huppert
Attorney, Agent, or Firm—Bruce L. Adams; Van C. Wilks

[57] ABSTRACT

A method of and means for manufacturing an article, such as a toothpaste tube having a captive cap, by injection moulding. An elongated core (2) is projected into the hollow of a die (1) to engage an aligning surface (5) on the core (2) with a mating aligning surface (6) on the die (1) at commencement of the injection moulding cycle. Then during continuation of the moulding cycle disengaging the aligning surfaces are disengaged to form a membrane (33) between the disengaged surfaces.

8 Claims, 11 Drawing Figures

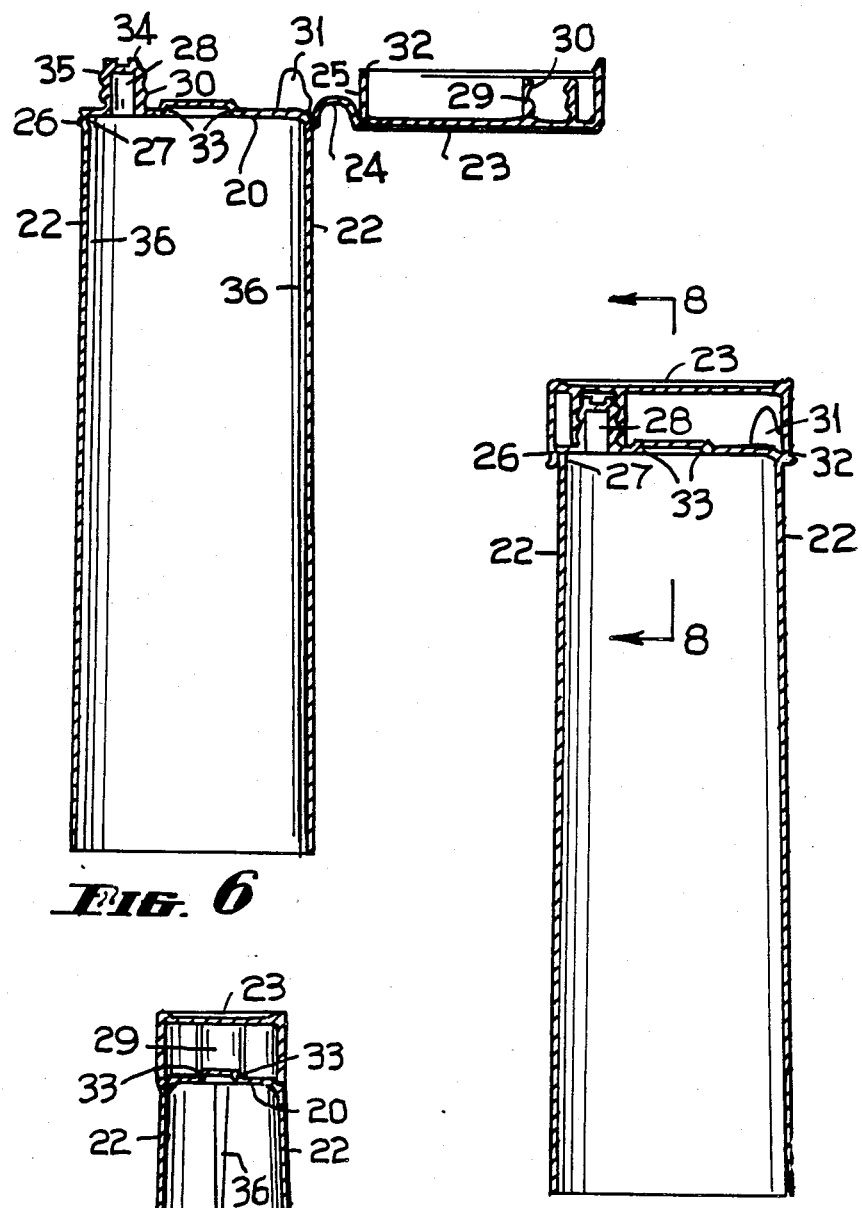

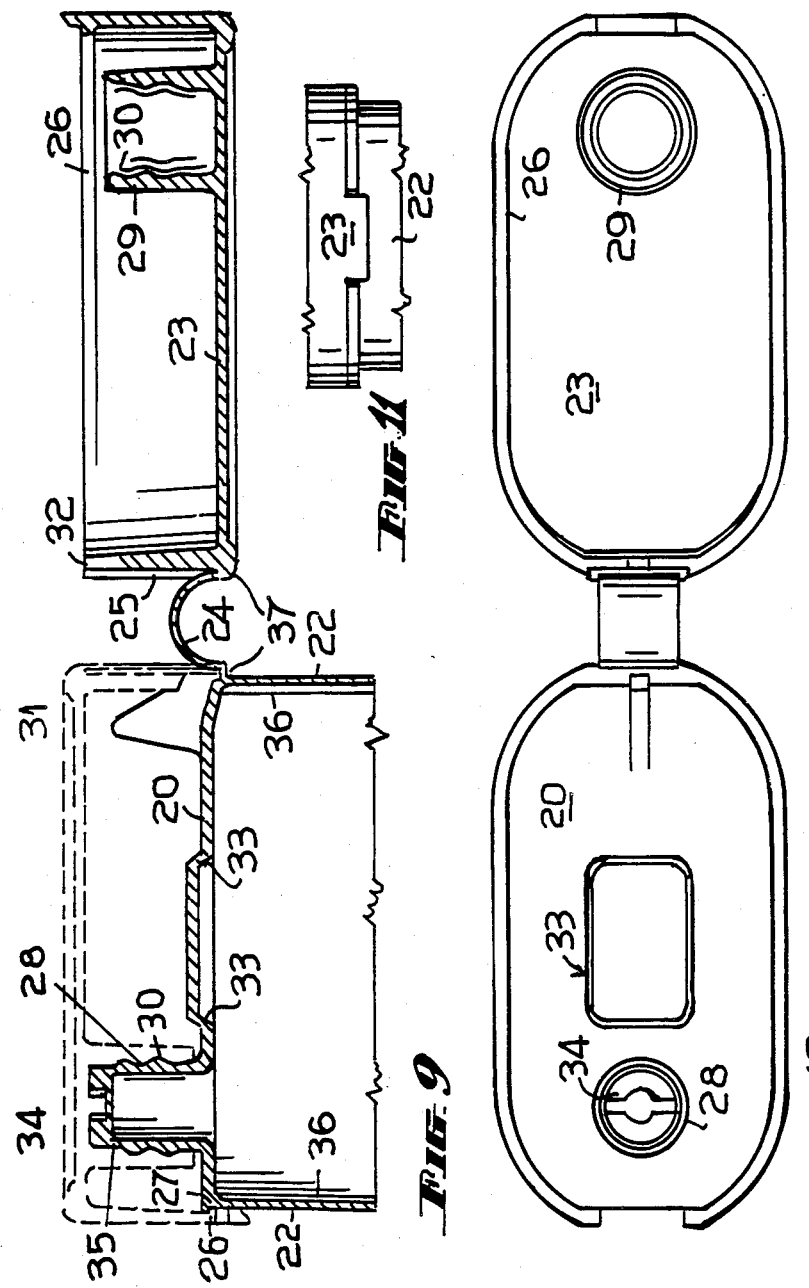

METHOD OF AND MEANS FOR MANUFACTURE OF A DISPENSER FOR VISCOUS OR SEMI-VISCOUS MATERIALS

This invention relates to a method of and means for manufacture of a dispenser for viscous or semiviscous material and in particular it relates to a dispenser of the type generally referred to in my earlier specification published under International Publication No. WO81/01544, of the 11th June, 1981 and based on Australian priority date of the 30th Nov., 1979.

In that earlier specification a method of moulding a one piece tube with an integral cap was described and the present invention relates to certain improvements to that form of production and structure but is not necessarily limited only to that tube construction, but applies generally where production of a tube is by use of an outer die and an inner movable core between which a cavity is formed to provide an injection moulded tube of the required characteristics.

One of the problems with this type of construction is the maintenance of the core position as core shift or core bend, hereinafter included in the term 'core shift', is known to occur and can result in uneven moulding and similar problems but is one of the objects of the present invention to overcome this problem and to provide a method of and means for allowing moulding to be very effectively controlled to avoid core shift and similar problems.

It is also an object of the invention to provide a highly effective form of forming a unitary tube having a displaceable cap which can be moulded by a single injection operation.

The basis of the preferred form of the present invention is the use of a first aligning face which may be formed in a recess in the die and a second aligning face which may be formed on the core, so arranged that at the commencement of the injection cycle the plastic is injected through a duct into the area defined by either aligning face, flow takes place from the duct through channels radiating out from the duct to effect adequate flow control of the plastic flow in the required directions and to control the quantity in such directions, but to so arrange the position of the core in relation to the die that just before the cessation of the flow cycle, or during the latter part of such flow cycle, the core is moved axially in relation to the die to allow a complete membrane to be formed across the end of the moulded tube, the shaping of the recess and projection being such that around the periphery an angle is used which during the initial part of the injection firmly holds the core in alignment in the outer die but nearing the end of the injection cycle the space between the aligning faces is opened out to provide the membrane which then extends across the tube and carries the nozzle through which discharge of material carried by the tube takes place.

In its broadest form the invention is designed to stabilize an elongated core which needs to project freely into a cavity in a die which may have unequal forces on it due to the shape of the article formed, or flow characteristics of the filling material, and in such a case the invention has interengaging aligning faces at the critical otherwise unsupported inner end portion of the core and die to prevent core shift during initial injection into the cavity, and when stabilizing of the core in the cavity occurs during injection, the core or portion of it is moved slightly relative to the die to form a continuous membrane across the area where the aligning face had prevented deposition.

In this way the core is held stable at the critcal start of the injection cycle but then is completed by moving the aligning faces apart to allow injection to continue into these spaces.

Thus the method of manufacture of a dispenser for viscous or semi-viscous materials according to the preferred form of this invention in which a hollow inner die has projecting into it a core to form between them a cavity which defines the dispenser which has one end closed but may include a discharge nozzle and has a wall at the perimeter of the end closure extending substantially on one side thereof to form the elongated hollow body of the tube, the method comprising the steps of axially aligning the end of the core in the cavity by engaging an aligning face on the inner end of the core with a mating aligning face on the die to firmly locate the inner free end of the core in axial alignment with the cavity in the die, commencing injection of the material forming the tube while thus holding the core in axial alignment with the cavity in the die to partly form the end of the tube and to form the wall of the tube, effecting relative movement between the core and the die to separate the mating aligning faces, and continuing injection to form a membrane between the aligning faces to complete the end closure.

The means for the manufacture of such a dispenser comprise an aligning face at the inner end portion of the core sloping in relation to the axis of the core, and a mating aligning face on the die arranged to engage the face on the core to axially align the core in the die when the core is positioned in the die, the die and core being arranged to have relative axial movement whereby to disengage the faces during a two part moulding process at which first stage the core is axially aligned with the cavity in the die by interengagement of the aligning faces but at the second stage of which the aligning faces are separated by the relative axial movement to extend the cavity across the end of the tube.

The material from which the tube is to be formed is preferably injected into the space defined by the aligning faces and through channels into the cavity between the core and the die surrounding the faces.

The invention is particularly adapted to form toothpaste tubes into which the material can be fed through the open end and the end then sealed, whereby the content is held against contamination or loss until removed through a nozzle at the closed other end of the tube, but is not to be limited to this use as it is advantageous wherever accurately formed an elongated tube having one end closed is to be formed, the invention ensuring that the core will not shift in the die during the heavy injection moulding stresses which would result in unsatisfactory non-uniform wall thicknesses of the body of the tube and also undesirable distribution of the material.

The general description herein will be made with reference to such a tube and will refer to refinements of such a tube itself which are possible because of the satisfactory flow control achievable by this invention.

It is important to note that while in the description herein the core has an axially movable section which carries the aligning face, this face could be formed on the core itself and the complete core moved axially in relation to the die. It is however generally convenient to have a smaller separately movable aligning member.

In order however that the nature of the invention can be fully appreciated it will now be described with reference to the accompanying drawings in which:

FIG. 6 is a transverse section of a tube formed according to this invention with the captive cap in the position in which it is withdrawn from the die.

FIG. 7 is a view similar to FIG. 6 but showing the captive cap in position to close the end of the tube.

FIG. 8 is a transverse section of the tube on line 8—8 of FIG. 7.

FIG. 9 is an enlarged view of the end of the tube to show preferred details of construction.

FIG. 10 is a plan of the tube as shown in FIG. 9, and

FIG. 11 is a fragmentary view of the end of the tube showing the junction of the cap with the body of the tube.

Figure 1:
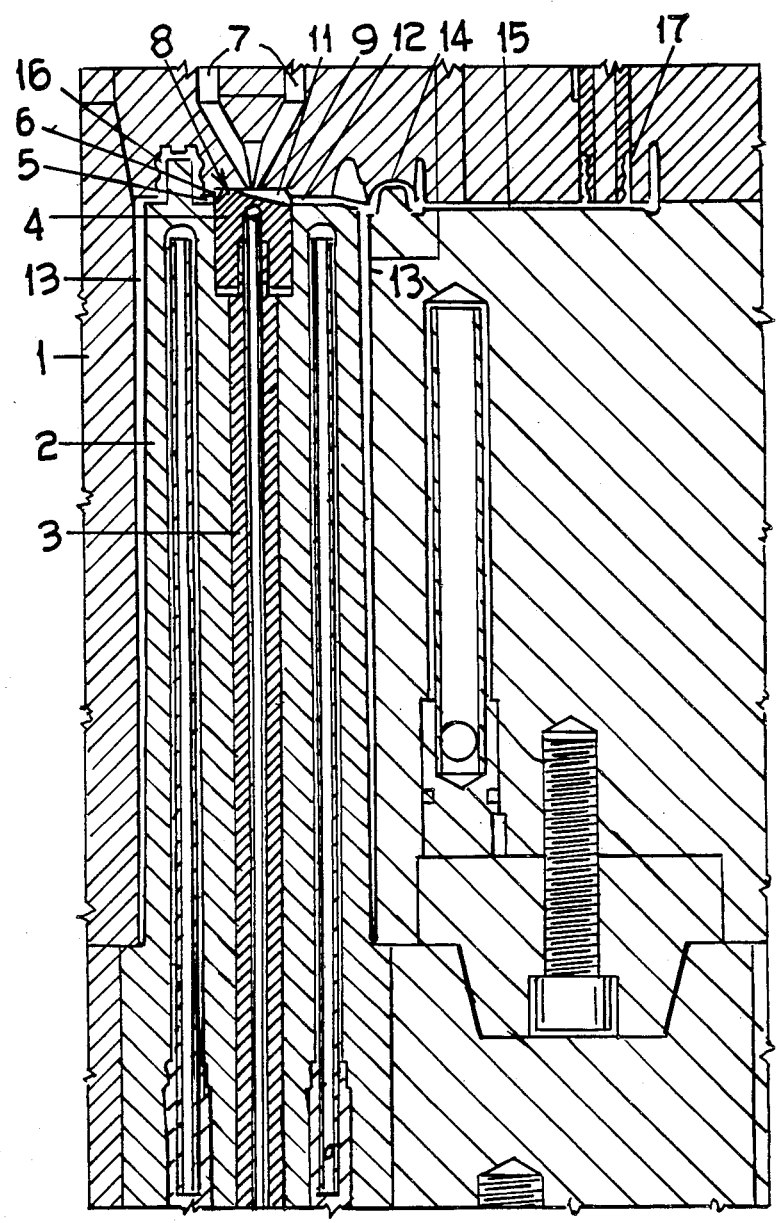
FIG. 1 is a transverse section of portion of a die for forming a tube having an attached cap.
Figure 2:
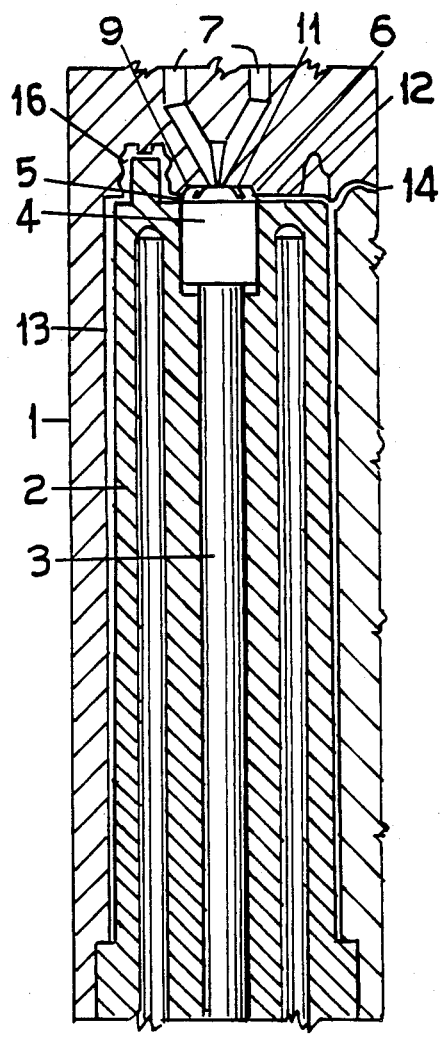
FIG. 2 is a schematic transverse section of part of the die and core showing particularly the aligning faces in their engaged position during the initial part of an injection moulding, disengagement of the aligning faces being by relative axial movement between the core and die.

Referring first particularly to the die and core, the die 1 can be of any usual or approved construction, preferably built up of a number of metal layers in which the cavities are formed and provided with the necessary temperature regulating and flow means which are not specifically referred to herein as being within the ambit of persons versed in the art of injection moulding.

The core 2 has in it an axially movable stem having at its inner end an aligning member 4 which has at its end an aligning face 5 adapted to engage a mating aligning face 6 in the die 1.

Figure 3:
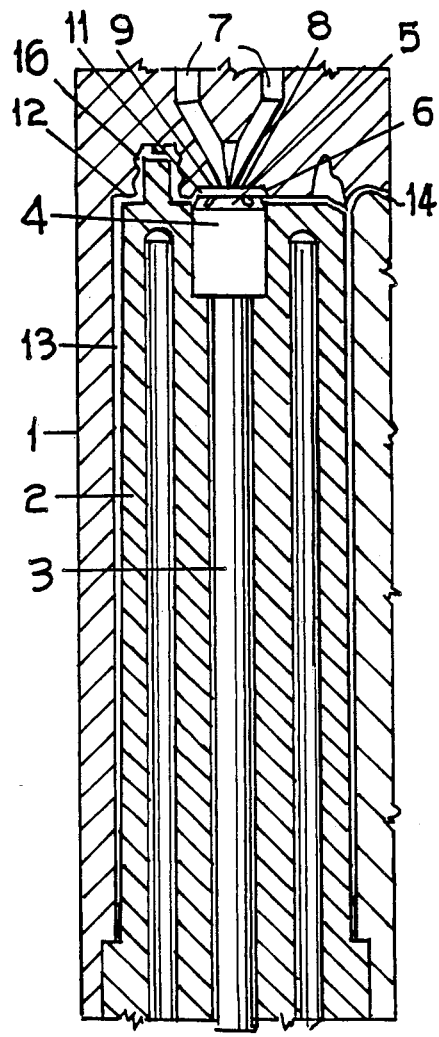
FIG. 3 is a view similar to FIG. 2 but showing the core retracted to allow the moulding material to flow between the aligning faces on the core and the mating aligning face on the die.
Figure 4:
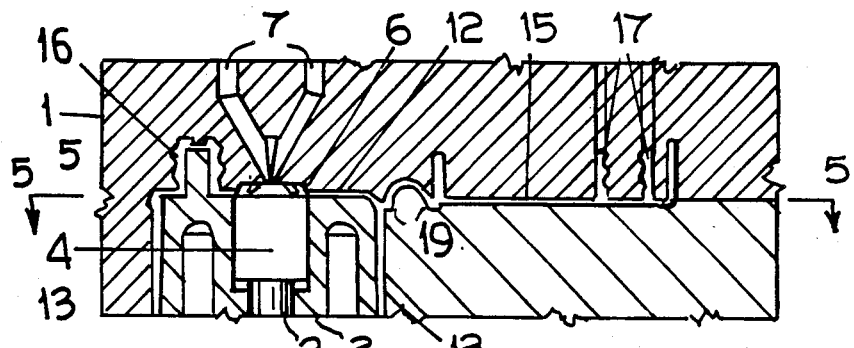
FIG. 4 is of use similar to FIG. 2 but showing particularly the core and die for forming a closed end tube having a captive cap.

The die 1 has in it a central duct 7 through which the moulding material is injected, and this duct opens into the space 8, see FIG. 3, defined by the aligning face 6 which face is at the perimeter of a recess 9 in the die 1.

Figure 5:
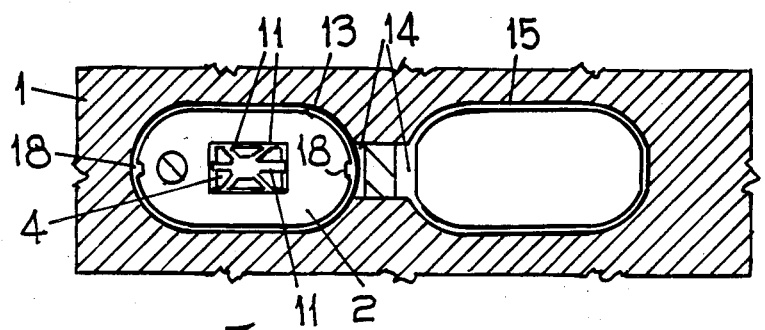
FIG. 5 is a sectional plan on line 5—5 of FIG. 4.

The aligning member 4 has its end of truncated pyramidal form as shown particularly in FIG. 5 but can be in truncated conical form, the face 5 being formed on the end of the aligning member 4, the aligning member 4 being movable to cause the end to project to engage in the recess 9.

The face of the aligning member 4 has in it a series of channels 11 which open to the injection duct 7 and serve to distribute the injection moulding material to the end closure cavity 12 formed between the hollow of the die 1 and the face of the core 2 and hence to the wall cavity 13.

The flow control so achieved allows precise supply of the ejection moulding material to all parts of the cavity, including the relatively small-dimensioned wall cavity 13 of the tube and through a hinge strap cavity 14 to the cap cavity 15.

The stem 3 is hollow and carries temperature-control fluid or fluids to the aligning member 4.

The die 1 as will be seen defines with the end of the core 2 the end closure cavity 12 which opens to the wall cavity 13, and this end closure cavity 20 opens to a nozzle cavity 16. The cap cavity 15 opens to a seal cavity 17.

A groove 18 is used to facilitate flow down the thin wall cavity 13.

The means for moving the aligning member 4 through the stem 3 can take any usual or approved form and its operation can be computer timed to ensure a correct sequence, using pressure and/or temperature sensing if required.

The hinge strap cavity 14 has ends 19 from which the cavity is directed generally in the plane of the wall cavity 13 and the rim of the cap cavity 15 so that the curved generally semi-circular shape shown results whereby stress at the two ends of the strap is minimised.

As described herein, the arrangement allows the channels 11 which lead from the main injection duct 7 on the axis of the core 2 to be varied in size to encourage correct flow velocity in different directions and for instance this can ensure the extra flow to the cap cavity 15 through the hinge strap cavity 14.

Describing now the dispenser itself which is formed between the die 1 and core 2, the end closure 20 formed in the end closure cavity 12 has the recess 9 formed in it which has inwardly sloping face 5 formed at its periphery, the wall 22 of the tube formed in the wall cavity 13 extending generally axially from the end closure 20. It is the length of this which causes core shift at the inner end of the moulding cavity, which shift is prevented by the arrangement of this invention.

The cap 23 is attached to the end closure 20 by the hinge strap 24 which is formed by flow through the hinge strap cavity 14, which hinge strap 24 is of relatively substantial dimension to ensure correct flow and is preferably of a length such and is curved when the cap is open so that the hinge part allows the cap to be moved readily away from its sealing position on the end of the tube during normal use. The cap feed can be enhanced by a channel bridging the strap 24. The hinge strap 24 folds into a recess 25 in the cap 23 when the cap 23 is swung over from its open and its moulding position into its closed position and because of the relative length of the curved hinged strap 24, while the hinge strap 24 is not visible as a projection when the tube is sealed allows a neat and highly effective construction to be achieved and allows the tube to be formed so that the cap 23 can lock into position by having an engaging rim 26 on it which engage a recess 27 in the periphery of the end closures 20 to form a lock sufficient to hold the cap 23 firmly in place but allowing the cap 23 to be opened when the content of the tube is to be ejected.

The discharge nozzle 28 is positioned remotely of the hinge strap 24 and the cap 23 carries a sealing socket 29 which fits over the nozzle 28 and the socket 29 and nozzle 28 has circumferential undulations 30 so that when the socket 29 is engaged on the nozzle 28 as the cap 23 is positioned in its closing location the cap 23 is guided into its final position and forms an effective seal not only of the outlet of the nozzle but of the whole of the area surroudning the nozzle to maintain hygenic conditions.

To facilitate ease of positioning of the cap the end closure has an outwardly extending guide member 31 adjacent to the hinge strap 24 which is adapted to engage a correspondingly shaped slit 32 on the cap 23 adjacent to the hinge strap 24 so that as the cap 23 is swung over and the hinge strap 24 is accommodated in the engaging slit 32 in the cap, the cap has that end firmly located by the upstanding guide member 31 to ensure that it readily engages the nozzle 28 and the periphery of the end closure 20 and this ensures that the cap 23 does not require holding means around its periphery adjacent to the hinge strap 24 but the holding means can be remote from this as the upstanding guide members 31 firmly locates the hinge end of the cap 23 against sideways displacement while at the other end of the nozzle 28 forms the guide and also the holding means but acting in association with the shaped engaging rim 26 fitting into the recess 27 remotely of the hinge strap 24.

In the drawings the part of the end closure 20 which is formed after the core 2 and die 1 are relatively moved during extrusion is designated 33 and is referred to as a membrane 33.

The discharge nozzle 28 has a break-away end 34 which on being rotated fractures at 35 to open the nozzle 28.

The groove 18 leaves longitudinal ridges 36 on the inner face of the wall 22.

As stated earlier the invention can be generally applied where a problem exists in maintaining a core in correct position in relation to a die and need not necessarily be limited to the formation of a tube as defined herein, the particular mating aligning members forming a highly advantageous form of flow control because when the two aligning faces are fully engaged the flow from the main injection channel is through channels radiating through the interengaging arrangement so that initially the injection in the various directions is closely controlled but before injection is completed relatively axial movement between the dies is effected so that the end of, for instance, a toothpaste tube, can be closed by an end closure extending across the tube end as defined herein, which end closure 20 may have a sealed or open discharge nozzle.

The hinge strap 24, as referred to earlier herein, is specially formed to be in the recess 25. The terminal portions 37 ensure that the bending stress is distributed over the cured part and not taken by acute angles and the ends. The portions 37 ensure that the hinge strap is stressed into the recess 25 where the cap 23 is closed onto the end closure 20.

I claim:

1. The method of manufacturing a dispenser for viscous or semi-viscous materials in which the dispenser is in the form of a tube having an end closure and extending from the perimeter thereof a generally tubular wall adapted after filling to be closed at its other end and including a cap attached by a hinge to the end closure to seal the end closure, and in which method an elongated core is projected into the hollow of a die and has its outer end stabilized by engaging an aligning face on the core with a mating aligning face on the die, characterised by the steps of:

(a) positioning a core (2) in the die (1) to define between them a wall cavity (13) communicating with an end closure cavity (12) in turn communicating through a hinge strap cavity (14) with a cap cavity (15), (b) stabilizing the core (1) in the die (2) by positioning an axially movable aligning member which is (4) slidable in the core to bring an aligning face (5) on the aligning member (4) into engagement with a mating aligning face (6) on the die (1) whereby to prevent core shift of the end of the core (2) in the die (1), (c) injecting flowable plastic material through a central duct (7) formed through the die (1) to the face of the aligning member (4), (d) selectively distributing the flow by means of channels (11) in the end face of the aligning member (4) into the end closure cavity (12) between the core (2) and the die (1) and down the wall cavity (13) and through a hinge strap cavity (14) to the cap cavity (15) to stabilise the core (2) in the die (1), and (e) withdrawing the aligning member (4) from its engagement with the die (1) while continuing flow to form a membrane in the end closure between the aligning face (5) of the end closure (2) and the aligning face (6) in the die (1)

whereby the end closure (20) and the wall (22) of the tube, and the hinge strap (24) and the cap (23), are formed while the core (2) is stabilised by the aligning member (4), and the closing membranes in the end closure (20) are formed when the aligning face (5) on the aligning member (4) is withdrawn from the aligning face (6) of the die (1).

2. The method of claim 1 wherein the said channels (11) are proportioned and positioned to regulate flow to the end closure cavity (12) and continuing flow from the end closure cavity (12) to the wall cavity (13) and through the hinge strap cavity (14) to the cap cavity (15) whereby to mould said complete dispenser by injection through the said channels (11) and through the end closure cavity (12).

3. A die and core assembly for the manufacture of a dispenser for viscous or semi-viscous materials in which a hollow in a die (1) has projecting into it a core (2) to form between them a tubular wall cavity (13) at an end closure cavity (12) and including a cap cavity (15), said tubular wall cavity (13) extending from the perimeter of the end closure cavity (12) to form the wall (22) and end closure (20) of an elongated hollow body of the dispenser, said cap cavity (15) communicating with the end closure cavity (12) by a hinge cavity (14) whereby a cap (20) is attached to the body by a hinge strap (24), characterised in that said core is substantially stationarily positioned in said die (1) throughout the moulding operation to define the said cavities (12,13,14,15) further characterised by an aligning member (4) on a stem (3) extendng through the core (2) in an axial direction of the core (2) and guided by the core (2) to be axially movable therein, an aligning face (5) on the said aligning member (4) sloping in relation to the axis of the core (2), a mating aligning face (6) on the die (1) for engaging the sloping aligning face (5) on the core (2) to axially align the core (2) in the die (1) during the initial moulding process but disengaging the said aligning faces (5,6) during the continuation of the moulding process after the core (2) is aligned in the die (1) by injected moulding material, further characterised by channels (11) in the ends of the aligning member (4) between a central injection duct (7) and the end closure cavity (12) arranged to selectively direct the flow of moulding material into the said cavities (12, 13,14,15).

4. Means according to claim 3 wherein the hinge cavity (14) is of elongated form to form a hinge strap (24) and the ends of the strap cavity (14) are in the general plane of the wall cavity (13) and the perimeter wall of the cap cavity (15), whereby the strap cavity (14) is of a generally semi-circular form.

5. Means according to claim 3 wherein the said cap (23) is dimensioned to extend over the end closure (20)

and wherein the core (2) and die (1) form a discharge nozzle (28) on the said end closure (20) remote from the said hinge strap (24), and a nozzle sealing socket (29) on the said cap (23) positioned to engage over the said discharge nozzle (28) when the said cap (23) is positioned over the end closure (20), and form undulating means (30) on the said discharge nozzle (28) and the socket (29) to releasably lock the said cap (23) to the said end closure (20).

6. Means according to claim 5 characterised by a guide member (31) upstanding on the said end closure (20) adjacent to the hinge strap (24), and a split (32) formed on the cap (23) adjacent to the hinge strap (24) positioned to engage over the said guide member (31) whereby to facilitate engagement of the discharge nozzle sealing socket (29) over the discharge nozzle (28).

7. Means according to claim 5 wherein in the die (1) forms an engaging rim (26) on the said cap (23) remote from the hinge strap (24) and a mating recess (27) at the perimeter of the end closure (20) to releasably lock the cap (23) on to the end closure (20) when the cap is engaged on the said end closure (20).

8. A dispenser formed by the method of claim 1 using a die (1) and core (2) characterised by an end closure (20) at one end of the dispenser, a tubular wall (4) extending on one side from the said end closure to form the body of the dispenser and elongated in cross-section, a cap (23) dimensioned to extend over the end closure (20), an elongated hinge strap (24) joining one end of the said end closure (20) to the one end of the said cap (23), a discharge nozzle (28) on the said end closure (20) remote from the said hinge strap (24), a nozzle sealing socket (29) on the said cap (23) positioned to engage over the said discharge nozzle (28) when the said cap (23) is positioned over the end closure (20), interengaging means (26,27) to releasably lock the said cap (23) to the said end closure, and means to align the cap (23) on the end closure (20) comprising upstanding guide member (31) on the end closure (20) adjacent to the hinge strap (24) and a slit (32) in the cap (23) positioned to engage the guide member (31).

* * * * *